(12) United States Patent
Asami

(10) Patent No.: US 9,247,619 B2
(45) Date of Patent: Jan. 26, 2016

(54) LUMINAIRE RECOGNITION DEVICE, LIGHTING SYSTEM, AND LUMINAIRE RECOGNITION METHOD

(71) Applicant: MegaChips Corporation, Osaka (JP)

(72) Inventor: Tomonobu Asami, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/388,507

(22) PCT Filed: Mar. 22, 2013

(86) PCT No.: PCT/JP2013/058437
§ 371 (c)(1),
(2) Date: Sep. 26, 2014

(87) PCT Pub. No.: WO2013/146619
PCT Pub. Date: Oct. 3, 2013

(65) Prior Publication Data
US 2015/0061505 A1    Mar. 5, 2015

(30) Foreign Application Priority Data

Mar. 26, 2012  (JP) .................................. 2012-069852

(51) Int. Cl.
*H05B 37/02* (2006.01)
*G01J 1/02* (2006.01)
(Continued)

(52) U.S. Cl.
CPC ........... *H05B 37/0218* (2013.01); *G01J 1/0228* (2013.01); *G01J 1/0242* (2013.01);
(Continued)

(58) Field of Classification Search
CPC ..................................................... H05B 37/02

USPC .............. 315/291, 307, 312, 185 R, 246, 224
See application file for complete search history.

(56) References Cited

U.S. PATENT DOCUMENTS

2006/0125426 A1* 6/2006 Veskovic et al. ............... 315/312
2007/0045524 A1* 3/2007 Rains et al. .................... 250/228
(Continued)

FOREIGN PATENT DOCUMENTS

| JP | 2005 228753 | 8/2005 |
|---|---|---|
| JP | 2008 204897 | 9/2008 |
| WO | 2008 081780 | 7/2008 |

OTHER PUBLICATIONS

International Search Report Issued Jun. 4, 2013 in PCT/JP13/058437 Filed Mar. 22, 2013.

*Primary Examiner* — Minh D A
(74) *Attorney, Agent, or Firm* — Oblon, McClelland, Maier & Neustadt, L.L.P.

(57) ABSTRACT

A luminaire recognition device in a lighting system having multiple luminaires with a dimming function installed in a predetermined area is configured to be arranged at a predetermined location in an area for associating identification information and installation site of each luminaire. The luminaire recognition device includes a controller configured to control an illuminance of each luminaire through communication, a detector configured to detect a brightness at the predetermined location, a memory configured to store correlation information between a brightness and distance from the predetermined location to each luminaire, and a processor configured to change an illuminance of a luminaire to be searched by a defined amount with the controller, calculate a change in brightness detected by the detector, and recognize the luminaire to be searched among the multiple luminaires, based on the change and the correlation information.

10 Claims, 12 Drawing Sheets

(51) Int. Cl.
*G01J 1/04* (2006.01)
*G01J 1/32* (2006.01)
*G01J 1/42* (2006.01)

(52) U.S. Cl.
CPC ............... *G01J 1/0437* (2013.01); *G01J 1/32* (2013.01); *G01J 1/4228* (2013.01); *H05B 37/0245* (2013.01); *G01J 2001/4247* (2013.01)

(56) References Cited

U.S. PATENT DOCUMENTS

| | | | |
|---|---|---|---|
| 2010/0311494 A1* | 12/2010 | Miller et al. | 463/22 |
| 2011/0001438 A1* | 1/2011 | Chemel et al. | 315/297 |
| 2011/0316426 A1 | 12/2011 | Iwanami et al. | |
| 2012/0038281 A1* | 2/2012 | Verfuerth | 315/152 |

* cited by examiner

Height of ceiling : 2.7m
Height of work plane : 0.7m

LUMINAIRE RECOGNITION DEVICE, LIGHTING SYSTEM, AND LUMINAIRE RECOGNITION METHOD

TECHNICAL FIELD

The present invention relates to a luminaire recognition device, a lighting system and a luminaire recognition method.

BACKGROUND ART

For example, Patent Literature 1 below describes a lighting control system according to a background art. This system includes multiple pieces of dimmable luminaire equipment, and a dimmer to control the dimming ratio of a desired piece of the luminaire equipment depending on an ambient brightness detected by a brightness sensor.

CITATION LIST

Patent Literature

Patent Literature 1: JP2008-204897A

SUMMARY OF THE INVENTION

Problems to be Solved by the Invention

In the lighting control system described in the above Patent Literature 1, the dimmer needs to recognize each piece of the luminaire equipment individually, in order for the dimmer to control the dimming ratio of a desired piece of the luminaire equipment. More specifically, identification information of each piece of the luminaire equipment such as MAC addresses and product serial numbers needs to be associated with the installation site of each piece of the luminaire equipment in advance.

However, since the identification information of the luminaire equipment generally has no relation to the installation sites, such association needs to be established by an operator in introducing the system by installing the luminaire equipment while checking the identification information and the installation sites individually or by installing the luminaire equipment randomly and then checking the identification information of each piece of the luminaire equipment. Thus the operation is complicated, resulting in possible erroneous association caused by operational errors.

The present invention has been made in view of such situation, and is directed to obtaining a luminaire recognition device, a lighting system, and a luminaire recognition method capable of simply and reliably associating identification information and installation site of each luminaire without manual work in a lighting system having multiple luminaires with a dimming function installed in a predetermined area.

Means to Solve the Problems

A luminaire recognition device according to a first aspect of the present invention is, in a lighting system having multiple luminaires with a dimming function installed in a predetermined area, configured to be arranged at a predetermined location in the area, for associating identification information and installation site of each of the luminaires. The luminaire recognition device includes a controller configured to control an illuminance of each luminaire through communication, a detector configured to detect a brightness at the predetermined location, a memory configured to store correlation information between a brightness and a distance from the predetermined location to each luminaire, and a processor configured to change an illuminance of a luminaire to be searched by a defined amount with the controller, calculate a change in brightness detected by the detector, and recognize the luminaire to be searched among the multiple luminaires, based on the change and the correlation information.

According to the luminaire recognition device of the first aspect, the memory stores correlation information between a brightness and a distance from a predetermined location where the luminaire recognition device is arranged to each luminaire. The processor changes an illuminance of a luminaire to be searched by a defined amount with the controller, calculates a change in brightness detected by the detector, and recognizes the luminaire to be searched among multiple luminaires, based on the change and the correlation information. This configuration realizes simple and reliable association between the identification information and the installation sites of the luminaires without manual work. Moreover, since there is no need for additional implementation of a function to recognize luminaires on numerous luminaires, increase in cost in introducing the system is minimized. Furthermore, recognition of luminaires based on change in brightness detected before and after changing the illuminance of the luminaires achieves accurate recognition of luminaires without influence by outside light.

A luminaire recognition device according to a second aspect of the present invention is the luminaire recognition device according to the first aspect. The detector includes multiple light receiving elements with limited directions of light different from each other.

According to the luminaire recognition device of the second aspect, the detector includes the multiple light receiving elements with limited directions of light different from each other. This configuration allows estimation of not only a distance from a predetermined location where the luminaire recognition device is arranged to a luminaire but also a direction of a site where the luminaire is installed from the predetermined location. Consequently, accurate recognition of each luminaire is achieved, even in a situation where the multiple luminaires are installed in a matrix form.

A luminaire recognition device according to a third aspect of the present invention is the luminaire recognition device according to the first aspect. The detector includes a light receiving element with a limited direction of light and a driving unit configured to drive the light receiving element to change the direction of light.

According to the luminaire recognition device of the third aspect, the detector includes the light receiving element with a limited direction of light and the driving unit configured to drive the light receiving element to change the direction of light. This configuration allows estimation of not only a distance from a predetermined location where the luminaire recognition device is arranged to a luminaire but also a direction of a site where the luminaire is installed from the predetermined location. Consequently, accurate recognition of each luminaire is achieved, even in a situation where the multiple luminaires are installed in a matrix form.

A luminaire recognition device according to a fourth aspect of the present invention is the luminaire recognition device according to the first aspect. The detector includes multiple light receiving elements. The light receiving elements are arranged at multiple locations in the area.

According to the luminaire recognition device of the fourth aspect, the detector includes multiple light receiving elements with the light receiving elements arranged at multiple locations in the area. This configuration allows estimation of a distance from a location of each light receiving element to the luminaires. Consequently, accurate recognition of each luminaire is achieved, even in a situation where multiple luminaires are installed in a matrix form.

A luminaire recognition device according to a fifth aspect of the present invention is the luminaire recognition device according to any one of the first to fourth aspects. The luminaire recognition device further includes a correction unit configured to correct the correlation information stored in the memory based on a result of luminaire recognition by the processor.

According to the luminaire recognition device of the fifth aspect, the correction unit corrects the correlation information stored in the memory, based on a result of luminaire recognition by the processor. Thus even if the correlation information prepared in advance includes an error, correction of the correlation information based on an actual measurement result achieves accurate recognition of luminaires from then onward.

A luminaire recognition device according to a sixth aspect of the present invention is the luminaire recognition device according to one of the first to fifth aspects. The luminaire recognition device further includes a first register configured to store first brightness data of a brightness detected by the detector before an illuminance of the arbitrary luminaire is changed, and a second register configured to store second brightness data of a brightness detected by the detector after an illuminance of the arbitrary luminaire is changed. The processor is configured to calculate the change based on the first brightness data stored in the first register and the second brightness data stored in the second register.

According to the luminaire recognition device of the sixth aspect, the first register is configured to store first brightness data of a brightness detected by the detector before the illuminance of the luminaire is changed, and the second register is configured to store second brightness data of a brightness detected by the detector after the illuminance of the luminaire is changed. The processor is configured to calculate a change in brightness, based on the first brightness data stored in the first register and the second brightness data stored in the second register. This configuration achieves simple and accurate calculation of change in brightness before and after the illuminance of the luminaire is changed.

An luminaire recognition device according to a seventh aspect of the present invention is the luminaire recognition device according to any one of the first to sixth aspect. The processor is configured to sequentially update the luminaire to be searched so as to sequentially recognize each of the multiple luminaires According to the luminaire recognition device of the seventh aspect, sequential update of the luminaire to be searched is performed to sequentially recognize each of the multiple luminaires. This configuration realizes recognition of all of the multiple luminaires installed in the area 1.

A luminaire recognition device according to an eighth aspect of the present invention is the luminaire recognition device according to the seventh aspect. The processor is configured to exclude a luminaire which have been recognized or failed to be recognized from update.

According to the luminaire recognition device of the eighth aspect, a luminaire which have been recognized or have failed to be recognized is excluded from update. Excluding recognized luminaires from update helps avoid repeated recognition of recognized luminaires. Similarly, excluding luminaires which have been failed to be recognized from update helps avoid repeated recognition of unrecognizable luminaires. When there is a luminaire which have been failed to be recognized, the luminaire can be recognized by retrying recognition with the luminaire recognition device at a different location.

A lighting system according to a ninth aspect of the present invention includes multiple luminaires with a dimming function installed in a predetermined area. The lighting system includes a luminaire control device connected to each of multiple luminaires and configured to perform lighting control on the connected luminaires, a master control device configured to control the luminaire control device for lighting control of the multiple luminaires based on an environmental factor of the area, and luminaire recognition device arranged at a predetermined location in the area to associate identification information and installation site of each luminaire. The luminaire recognition device includes a controller configured to control an illuminance of each luminaire through communication, a detector configured to detect a brightness at the predetermined location, a memory configured to store correlation information between a brightness and a distance from the predetermined location to each luminaire, and a processor configured to change an illuminance of a luminaire to be searched by a defined amount with the controller, calculate a change in brightness detected by the detector, and recognize the luminaire to be searched among the multiple luminaires based on the change and the correlation information.

According to the lighting system of the ninth aspect, the memory is configured to store correlation information between a brightness and a distance from the predetermined location where the luminaire recognition device is arranged to each luminaire. The processor is configured to change an illuminance of a luminaire to be searched by a defined amount with the controller, calculate a change in brightness detected by the detector, and recognize the luminaire to be searched among the multiple luminaires based on the change and the correlation information. This configuration realizes simple and reliable association between the identification information and the installation sites of the luminaires without manual work. Moreover, since there is no need for additional implementation of a function to recognize luminaires on numerous luminaires, increase in cost in introducing the system is minimized Furthermore, recognition of luminaires based on change in brightness detected before and after changing the illuminance of the luminaires achieves accurate recognition of luminaires without influence by outside light.

A luminaire recognition method according to a 10th aspect of the present invention in a lighting system having multiple luminaires with a dimming function installed in a predetermined area, for associating identification information and installation site of each luminaire includes (A) controlling an illuminance of each luminaire through communication, (B) detecting a brightness at a predetermined location in the area, (C) preparing correlation information between a brightness and a distance from the predetermined location to each luminaire, and (D) changing an illuminance of a luminaire to be searched by a defined amount in the (A), calculating a change in brightness detected in the (B), and recognizing the luminaire to be searched among the multiple luminaires based on the change and the correlation information.

According to the luminaire recognition method of the tenth aspect, in (C), correlation information between a brightness and a distance from a predetermined location to each luminaire in the area is prepared. In (D), illuminance of a luminaire to be searched is changed by a defined amount in (A), a change in brightness detected in (B) is calculated, and the luminaire to be searched among the multiple luminaires are recognized based on the change and the correlation information. This configuration realizes simple and reliable association between the identification information and the installation sites of the luminaires without manual work. Moreover, since there is no need for additional implementation of a function to recognize luminaires on numerous luminaires, increase in cost in introducing the system is minimized. Furthermore, recognition of luminaires based on change in brightness detected before and after changing the illuminance of the luminaires achieves accurate recognition of luminaires without influence by outside light.

Effects of the Invention

According to the present invention, in a lighting system having multiple luminaires with a dimming function installed in a predetermined area, a luminaire recognition device, lighting system, and luminaire recognition method that realize simple and reliable association between the identification information and the installation sites of the luminaires without manual work are obtained.

These and other objects, features, aspects and advantages of the present invention will become more apparent from the following detailed description of the present invention when taken in conjunction with the accompanying drawings.

DESCRIPTION OF THE INVENTION

Figure 1:
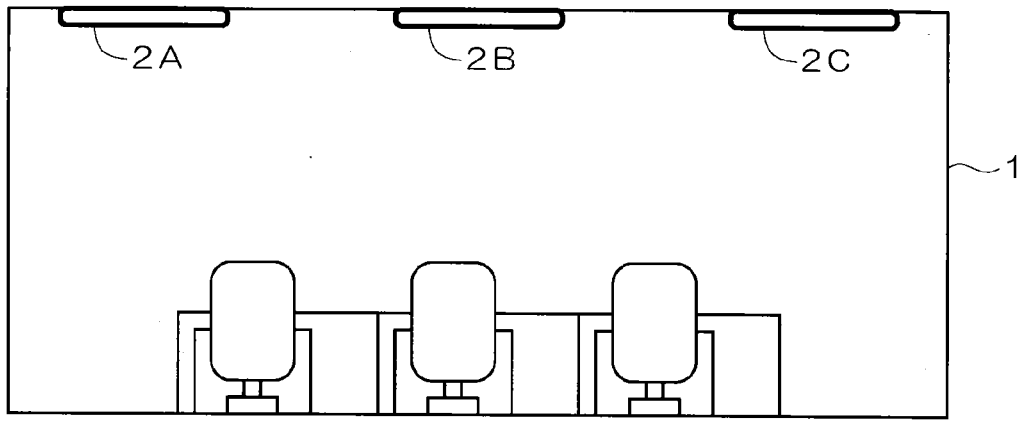
FIG. 1 is a diagram illustrating an example of an installation environment of the lighting system according to an embodiment of the present invention.

Preferred embodiments of the present invention are described in detail below referring to the drawings. It should be noted that identical reference numerals throughout the drawings indicate identical or equivalent elements.

Figure 2:
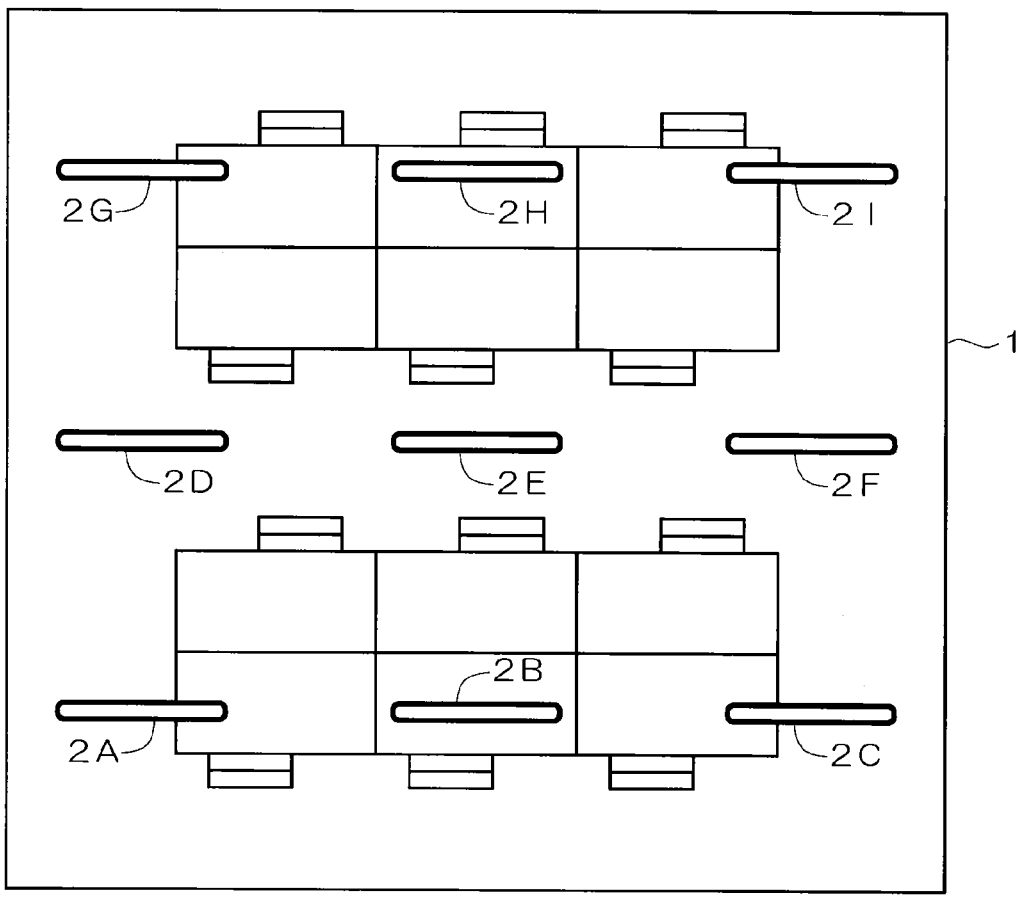
FIG. 2 is a diagram illustrating an example of an installation environment of the lighting system according to an embodiment of the present invention.

FIGS. 1 and 2 are diagrams illustrating an example of an installation environment of the lighting system according to an embodiment of the present invention. In the example of the embodiment, the lighting system is installed in an area 1, which is a room in an office. The area 1 has multiple luminaires 2 having a dimming function (nine luminaires 2A to 2I in this example) and being installed in proper alignment to form grids at regular intervals. The luminaires 2 are, for example, HF or LED lamps. Each of the luminaires 2 has unique identification information such as a MAC address or a product serial number. However, as the luminaires 2 are installed at a random site, the identification information of the luminaires 2 has no direct relation to the installation sites. It should be noted that the lighting system according to the present embodiment is applicable not only to offices but also to an arbitrary environment where multiple luminaires are installed in a certain area such as schools, hospitals, libraries, stations, airports, and shops.

Figure 3:
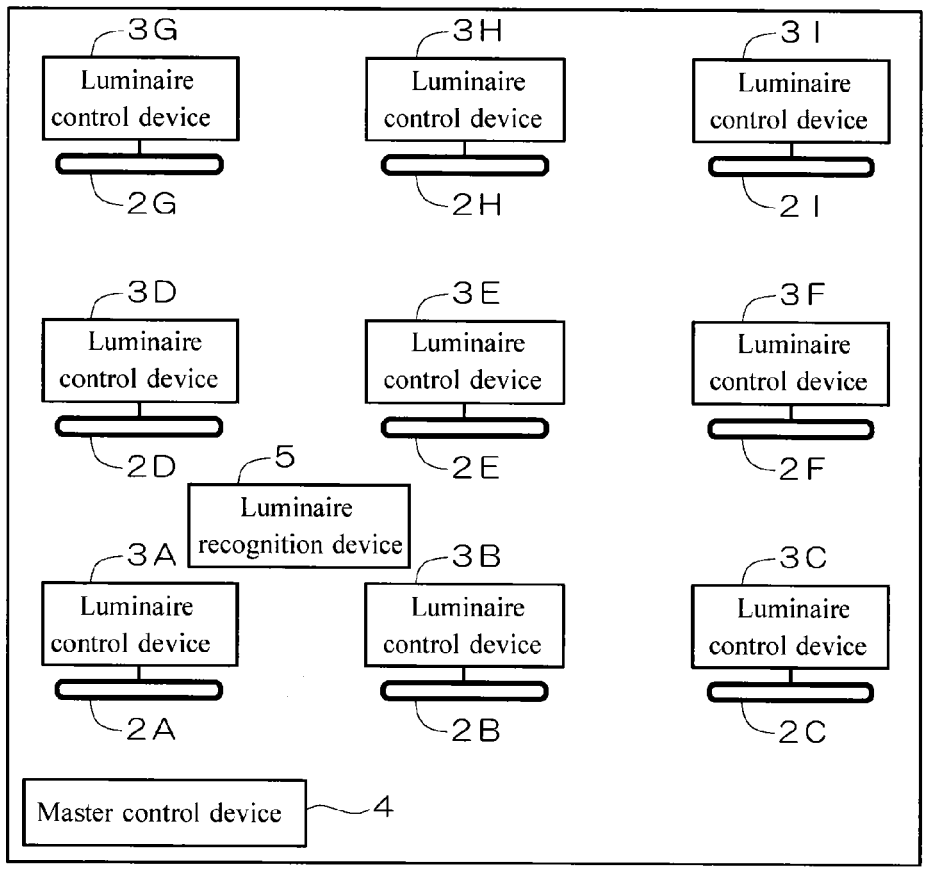
FIG. 3 is a diagram illustrating an example of a configuration of the lighting system according to the present embodiment.

FIG. 3 is a diagram illustrating an example of a configuration of the lighting system according to the present embodiment. The lighting system includes a luminaire control device 3 connected to the luminaires 2, a master control device 4, and a luminaire recognition device 5. In this example, luminaire control devices 3A to 3I are respectively connected to the luminaires 2A to 2I.

The luminaire control device 3 performs lighting control of the luminaires 2 connected to itself, based on an instruction from the master control device 4 or the luminaire recognition device 5 in accordance with an arbitrary control scheme such as Pulse Width Modulation (PWM), Pulse Amplitude Modulation (PAM), Pulse Density Modulation (PDM), and Pulse Frequency Modulation (PFM). The master control device 4 performs lighting control of the luminaires 2A to 2I based on various environmental factors (such as brightness of outside light and presence or absence of a person) of the area 1, by controlling the luminaire control devices 3A to 3I by an arbitrary communication method (or possibly combination of multiple communication methods) such as wireless communication, PLC communication, communication with a private line, and communication with generalized Ethernet (registered trademark). The luminaire recognition device 5 performs luminaire recognition (described in detail below) to associate the identification information of each of the luminaires 2 with the installation sites.

Figure 4:
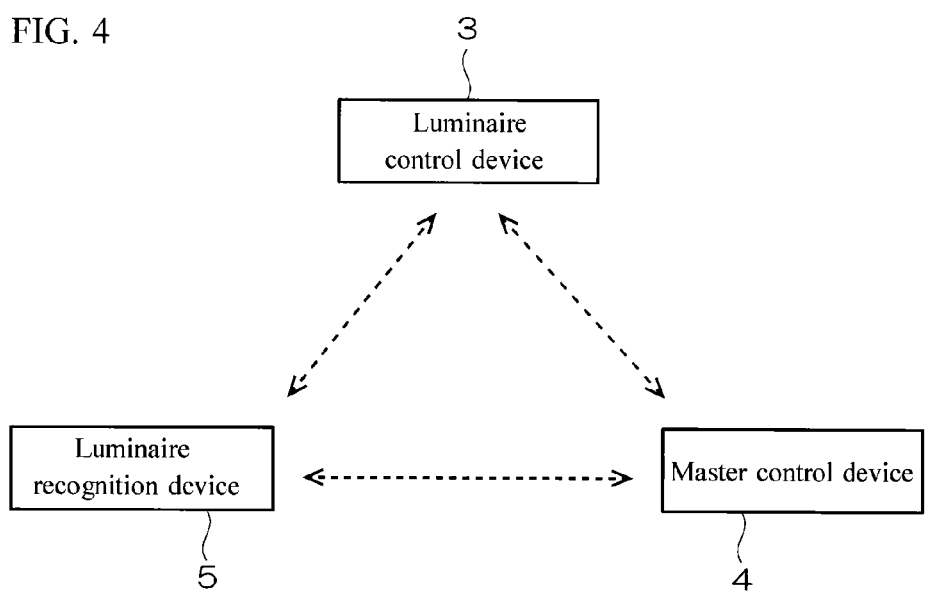
FIG. 4 is a diagram illustrating communication among the devices configuring the lighting system.

FIG. 4 is a diagram illustrating communication among the devices configuring the lighting system. The luminaire recognition device 5 is capable of directly communicating with the luminaire control device 3 and the master control device 4, the master control device 4 is capable of directly communicating with the luminaire control device 3 and the luminaire recognition device 5, and the luminaire control device 3 is capable of directly communicating with the luminaire recognition device 5 and the master control device 4. Communication among the devices is performed by the above arbitrary communication methods.

Figure 5:
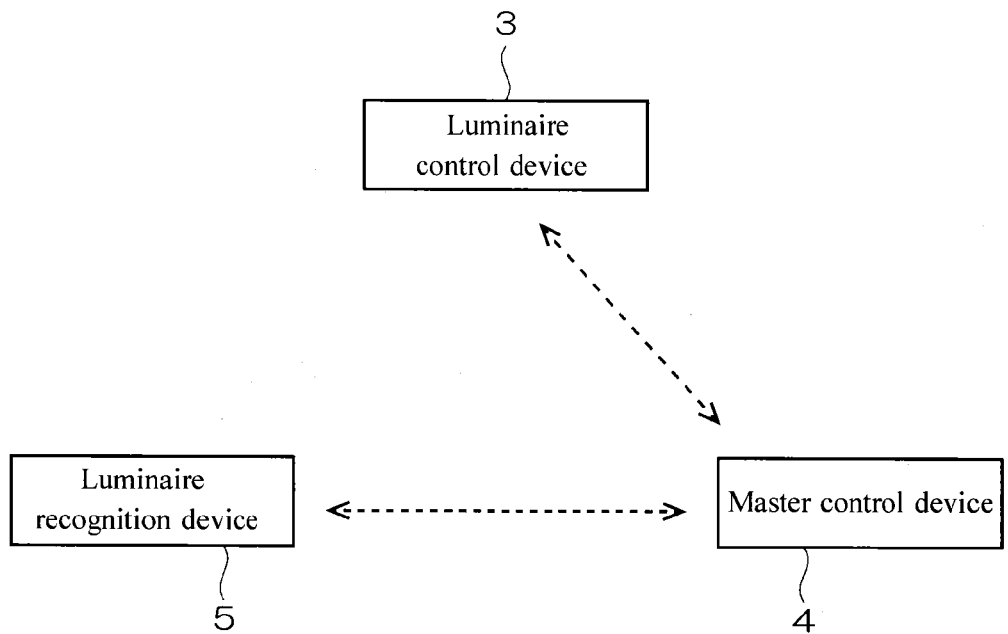
FIG. 5 is a diagram illustrating a modification of communication among the devices configuring the lighting system.
Figure 6:
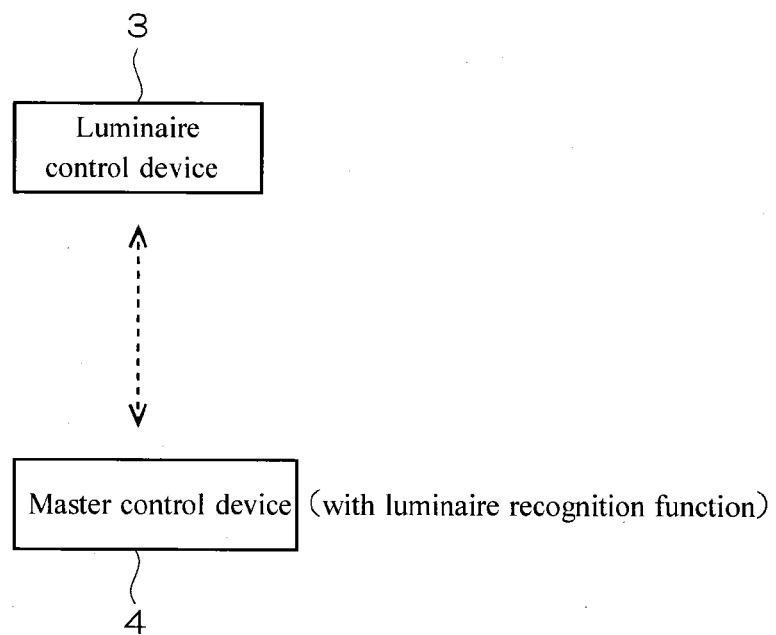
FIG. 6 is a diagram illustrating a modification of communication among the devices configuring the lighting system.

FIGS. 5 and 6 are diagrams illustrating a modification of communication among the devices configuring the lighting system. In the example illustrated in FIG. 5, the luminaire recognition device 5 is capable of directly communicating with the master control device 4, and is also capable of communicating with the luminaire control device 3 via the master control device 4. The master control device 4 is capable of directly communicating with the luminaire control device 3 and the luminaire recognition device 5. The luminaire control device 3 is capable of directly communicating with the master control device 4, and is also capable of communicating with the luminaire recognition device 5 via the master control device 4.

In the example illustrated in FIG. 6, the function of the luminaire recognition device 5 is implemented on the master control device 4, so that a dedicated luminaire recognition device 5 is omitted. The master control device 4 and the luminaire control device 3 are capable of directly communicating with each other.

Figure 7:
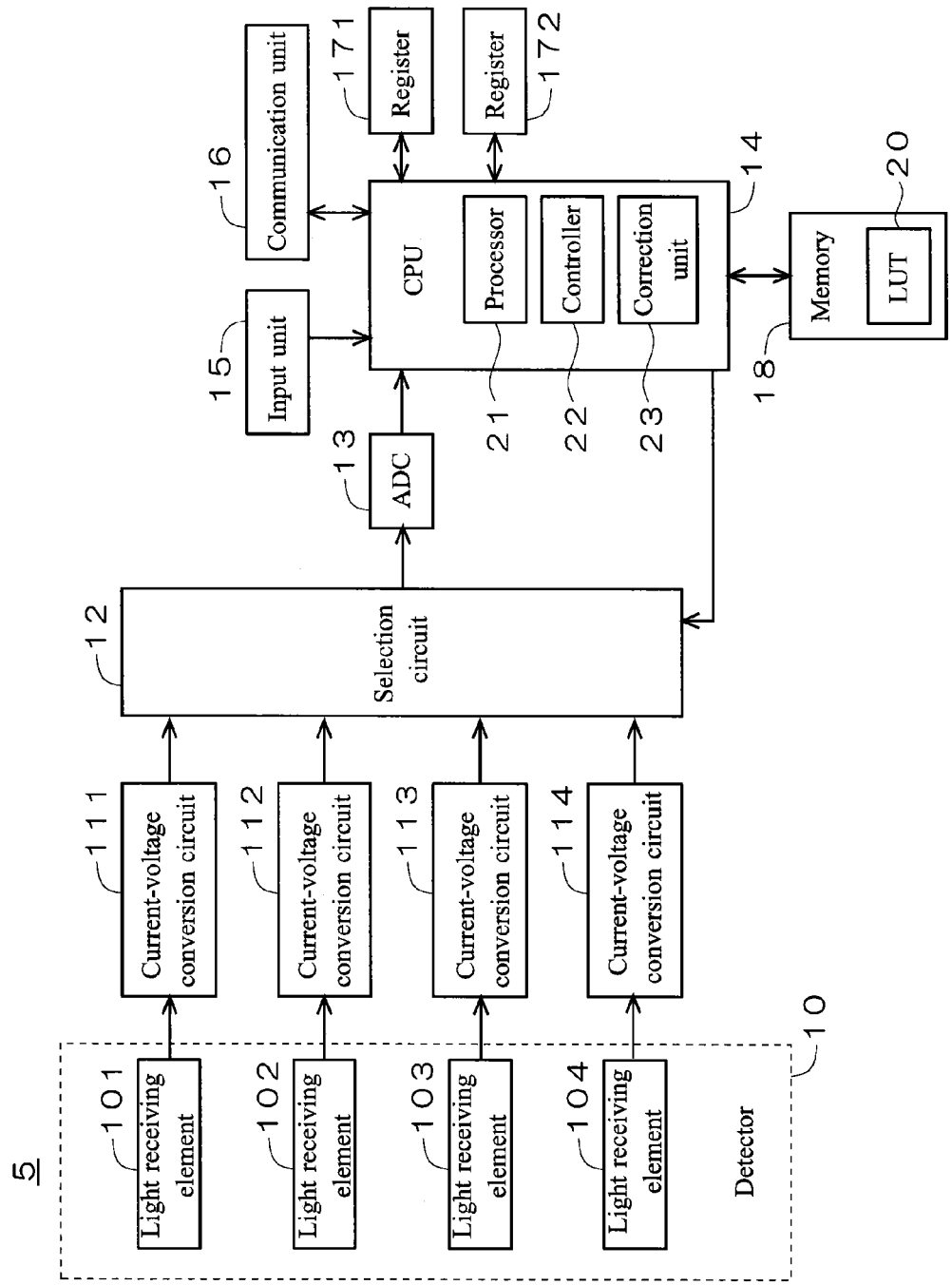
FIG. 7 is a block diagram illustrating an internal configuration of the luminaire recognition device in FIG. 4.

FIG. 7 is a block diagram illustrating an internal configuration of the luminaire recognition device 5 in FIG. 4. FIG. 7 illustrates a relation of connection of the luminaire recognition device 5 including a detector 10, current-voltage conversion circuits 111 to 114, a selection circuit 12 such as a multiplexer, an A/D converter 13, a CPU 14, an input unit 15, a communication unit 16, registers 171 and 172, and a memory 18 such as semiconductor memory and magnetic disk. The detector 10 includes light receiving elements 101 to 104 such as photodiode. The CPU 14 operates in accordance with a predetermined program to serve as a processor 21, controller 22, and correction unit 23. The memory 18 stores a look-up table 20 indicating correlation information between brightness and distance. The input unit 15 inputs data input with an operation switch, a touch panel, or the like provided for the luminaire recognition device 5, data input with a keyboard, a mouse, or the like connected to the luminaire recognition device 5, or data received from a PC, a portable terminal, or the like via an arbitrary communication channel such as LAN, to the CPU 14.

Figure 8A:
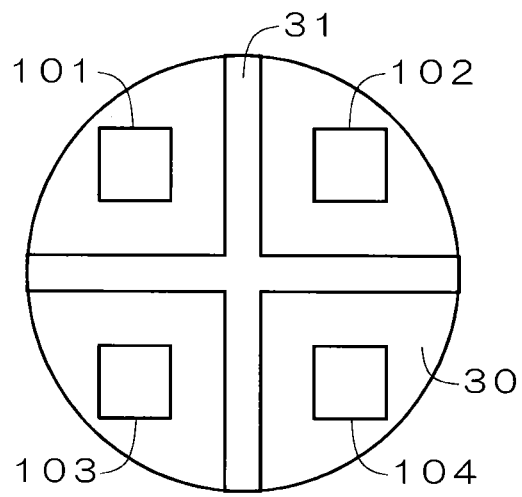
FIGS. 8A and 8B are diagrams schematically illustrating an external configuration of the detector.
Figure 8B:
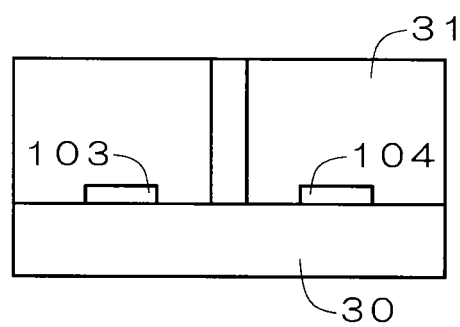

FIGS. 8A and 8B are diagrams schematically illustrating an external configuration of the detector 10. FIG. 8A is a top view and FIG. 8B is a side view. A crossed douser 31 is fixed on a substrate 30. The light receiving elements 101 to 104 are separately disposed in areas divided by the douser 31. With this configuration, directions of light, which is a direction from which the light receiving elements 101 to 104 receive light, are limited by the douser 31. Instead of the above configuration where the douser 31 is employed to limit the directions of light, a lens (or prism, mirror, or the like) having directivity may be arranged on the light receiving elements 101 to 104 to limit the directions of light of the light receiving elements 101 to 104. Moreover, instead of the above configuration where the directions of light in 360 degrees are divided into four by the four light receiving elements 101 to 104, for example, the directions may be divided into eight by eight light receiving elements. With such a configuration, accuracy in detection of directions is increased, and the dynamic range of the detector 10 is widened.

Figure 9A:
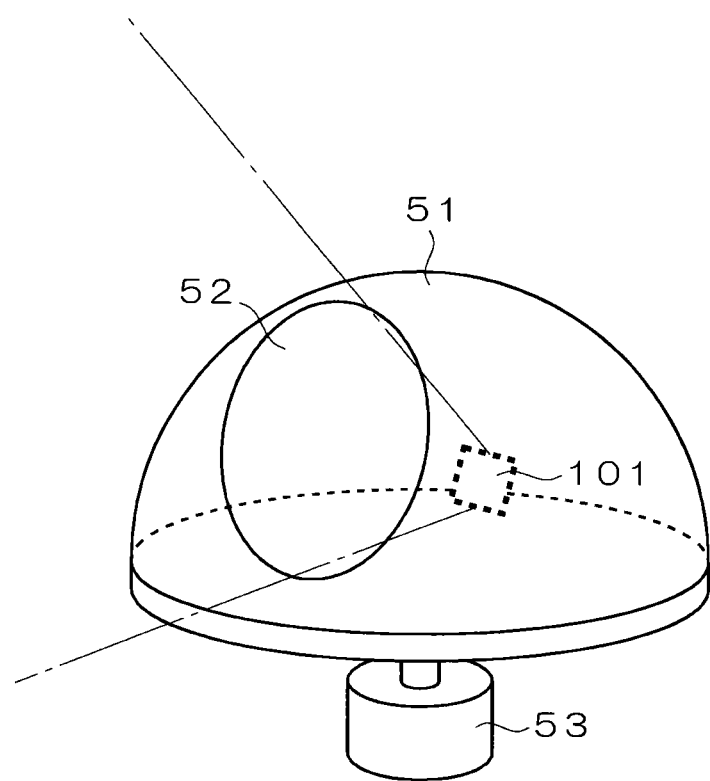
FIGS. 9A and 9B are diagrams schematically illustrating a modification of the configuration of the detector.
Figure 9B:
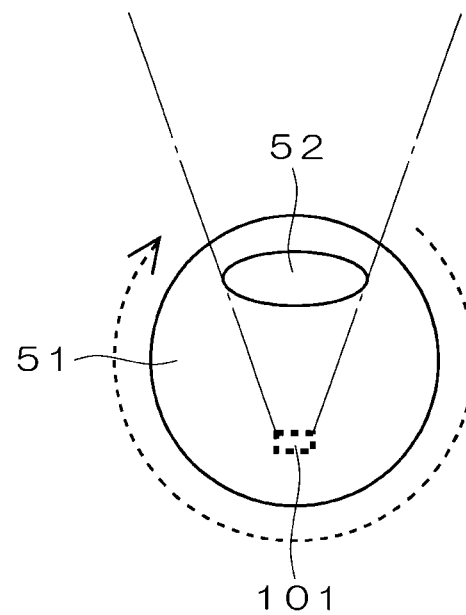

FIGS. 9A and 9B are diagrams schematically illustrating a modification of the configuration of the detector 10. FIG. 9A is an oblique view and FIG. 9B is a top view. A lens 52 (or just an opening) is arranged on a part of a light-blocking, dome-shaped case 51 over the light receiving element 101. This configuration limits the directions of light of the light receiving element 101. A sensor unit including the light receiving element 101, the case 51, and the lens 52 is driven by a driving unit 53 such as a motor attached to its bottom to rotate in a direction along the periphery as illustrated in FIG. 9B. This configuration changes the limited directions of light of the light receiving element 101.

Figure 10:
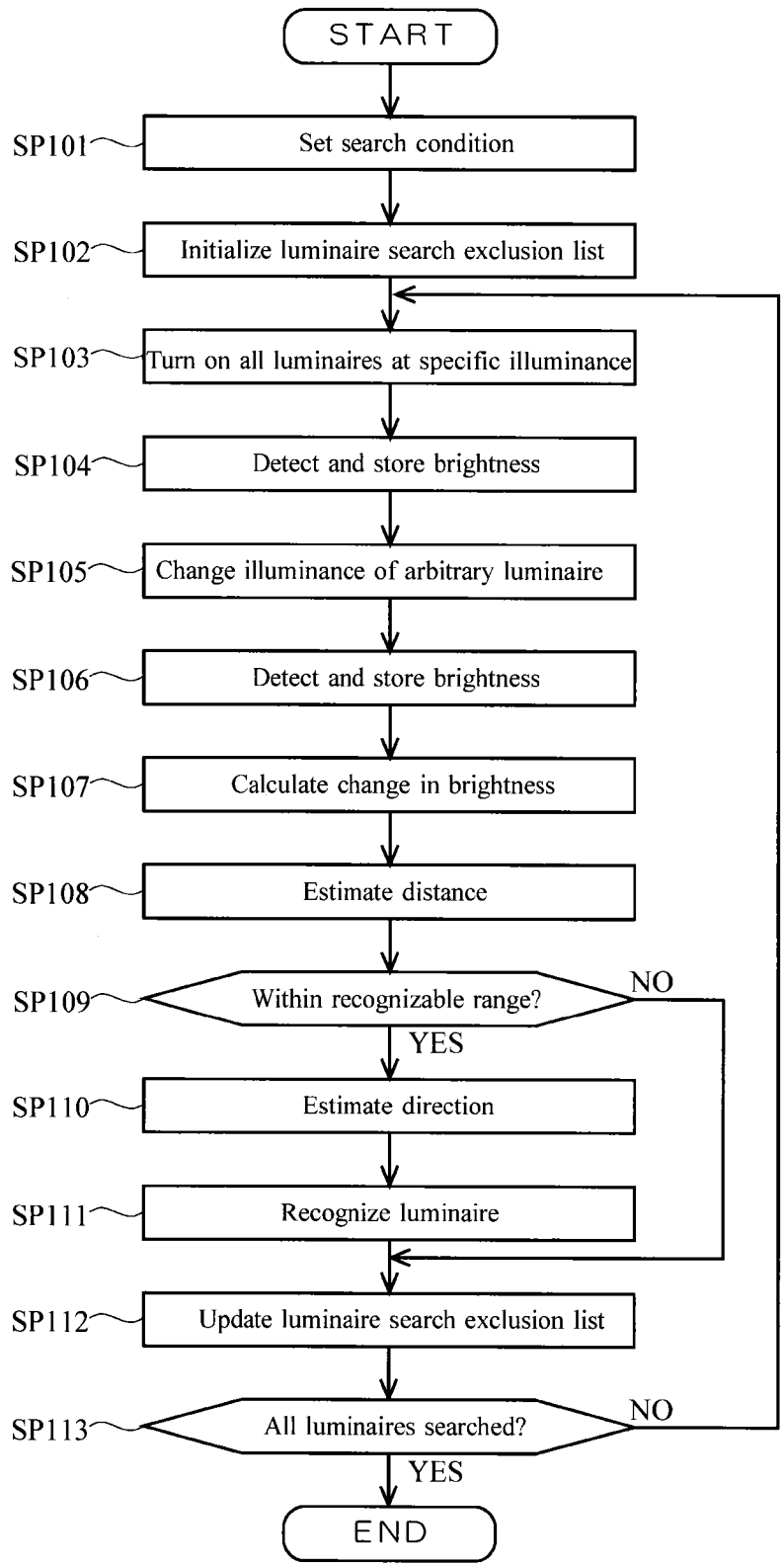
FIG. 10 is a flow chart representing a sequence of luminaire recognition by the luminaire recognition device.

FIG. 10 is a flow chart representing a sequence of luminaire recognition by the luminaire recognition device 5.

Firstly, before luminaire recognition starts, a look-up table 20 reflecting the environment of the area 1 is prepared in advance by the processor 21, and the look-up table 20 is stored in the memory 18.

An operator inputs data about the height of the ceiling of the area 1, the height of a work plane (height of a desk), the installation condition of the luminaires 2 (for example, spacing, direction, number, and layout), light distribution curve, direct horizontal brightness properties, and the like, through the input unit 15. The processor 21 generates grid data reflecting the installation environment of the luminaires 2, based on the input data.

Figure 11:
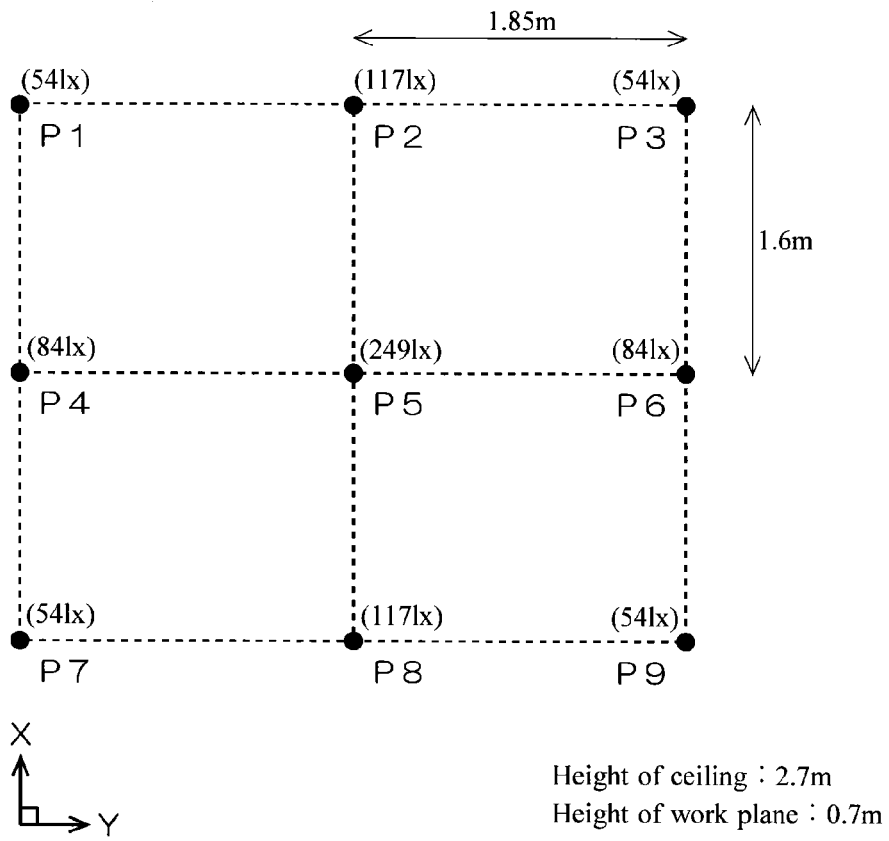
FIG. 11 is a diagram illustrating an example of grid data.

FIG. 11 is a diagram illustrating an example of the grid data. The intersection points P1 to P9 of the grid respectively correspond to the center point of each of the luminaires 2. In this example, the spacing between the luminaires 2 is 1.6 m along the X-axis and 1.85 m along the Y-axis. The height of the ceiling is 2.7 m, and the height of the work plane is 0.7 m.

The processor 21 calculates the brightness at the height of the work plane for each of the intersection points P1 to P9, with only one of the luminaires 2 corresponding to one arbitrary point among the intersection points P1 to P2 (in this example, the intersection point P5 at the center) turned on at a predetermined illuminance (for example, maximum illuminance), and all of the other luminaires 2 turned off Calculation of the brightness can be performed by an arbitrary calculation method of the brightness such as point-by-point method. In this example, the brightness is 249 lx at the intersection point P5, 117 lx at the intersection points P2 and P8, 84 lx at the intersection points P4 and P6, and 54 lx at the intersection points P1, P3, P7, and P9. The processor 21 parameterizes a correlation between a horizontal brightness and a horizontal distance based on a calculation result of the brightness, so as to create the look-up table 20 indicating correlation information between the brightness and the distance. Then the created look-up table 20 is stored in the memory 18.

The operator also arranges the luminaire recognition device 5 at an arbitrary location in the area 1 (in this example, right under the luminaire 2E at the center) at the height of the work plane. In doing so, the operator adjusts the direction of the luminaire recognition device 5 so that, for example, the light receiving element 101 faces in the direction of +X in FIG. 11, and the light receiving element 102 faces in the direction of +Y. Then the operator inputs the location and the direction of the luminaire recognition device 5 through the input unit 15.

Figure 12:
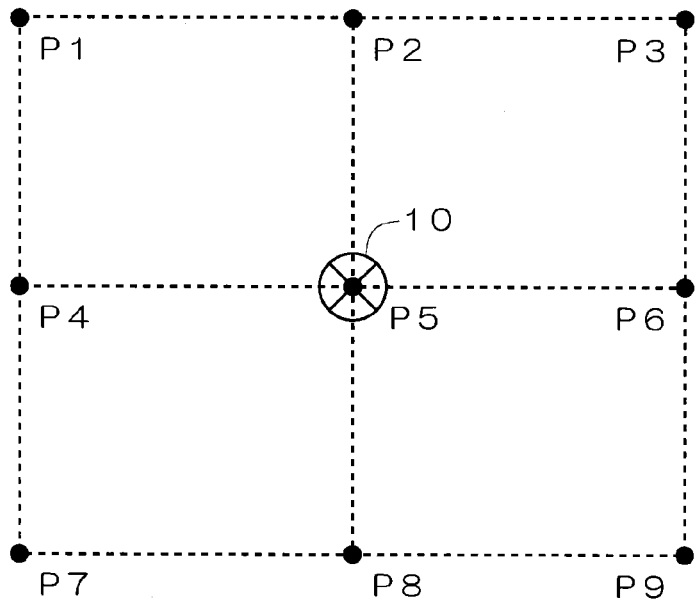
FIG. 12 is a diagram illustrating grid data of the location and the direction of the luminaire recognition device.

Referring to FIG. 10, the processor 21 sets a search condition in Step SP101. More specifically, the location and the direction of the luminaire recognition device 5 are set on the grid illustrated in FIG. 11. FIG. 12 is a diagram illustrating grid data of the location and the direction of the luminaire recognition device 5. In this example, the luminaire recognition device 5 (detector 10) is arranged on the intersection point P5.

In Step SP102, the processor 21 initializes a luminaire search exclusion list indicating luminaires 2 to be excluded from an update.

In Step SP103, the processor 21 turns on all of the luminaires 2A to 2I at a specific illuminance (in this example, maximum illuminance). More specifically, the processor 21 inputs a command to turn on all of the luminaires 2A to 2I at a specific illuminance to the controller 22. The controller 22 sends commands to turn on the luminaires 2 at the specific illuminance to the luminaire control devices 3A to 3I via the communication unit 16 by one operation. Thus the luminaire control devices 3A to 3I turns on the luminaires 2A to 2I at the specific illuminance.

In Step SP104, the detector 10 detects brightness at the location of the luminaire recognition device 5 with all of the luminaires 2A to 2I turned on at the specific illuminance Referring to FIG. 5, current values output from the light receiving elements 101 to 104 are converted into voltage values respectively by the current-voltage conversion circuits 111 to 114. The voltage values output from the current-voltage conversion circuits 111 to 114 are sequentially selected by the selection circuit 12 in accordance with control by the CPU 14 for input to the A/D converter 13, converted into a digital value by the A/D converter 13, and then sequentially input to the CPU 14. The processor 21 stores each voltage value input from the A/D converter to the CPU 14 (that is, each brightness value detected by the light receiving elements 101 to 104) in the register 171.

Referring to FIG. 10, in Step SP105, the processor 21 changes the illuminance of an arbitrary one of the luminaires 2 to be searched by a defined amount. For example, assuming the identification information pieces of the luminaires 2A to 2I respectively correspond to IDA to IDI, the identification information IDA is firstly selected, and a command to turn off the luminaire 2A having the identification information IDA is input to the controller 22. Here, the luminaires 2B to 2I having the other identification information IDB to IDI continues to be on at the above specific illuminance. The controller 22 sends a command to turn off the luminaire 2A to the luminaire control device 3A via the communication unit 16. Then the luminaire control device 3A turns off the luminaire 2A.

In Step SP106, the detector 10 detects brightness at the location of the luminaire recognition device 5 with the luminaire 2A turned off. Referring to FIG. 5, current values output from the light receiving elements 101 to 104 are converted into voltage values respectively by the current-voltage conversion circuits 111 to 114. The voltage values output from the current-voltage conversion circuits 111 to 114 are sequentially selected by the selection circuit 12 in accordance with control by the CPU 14 for input to the A/D converter 13, converted into a digital value by the A/D converter 13, and then sequentially input to the CPU 14. The processor 21 stores each voltage value input from the A/D converter to the CPU 14 (that is, each brightness value detected by the light receiving elements 101 to 104) in the register 172.

In Step SP107, the processor 21 calculates the change in brightness based on the brightness values stored in the registers 171 and 172. More specifically, the processor 21 calculates individual difference values D101 to D104, which is a difference value of the brightness detected by each of the light receiving elements 101 to 104, and a total difference value DALL, which is a difference value of total brightness detected by all of the light receiving elements 101 to 104.

Description above is given of an example of turning on all of the luminaires 2A to 2I in Step SP103 and then turning off the luminaire 2A to be searched in Step SP105, so as to calculate the individual difference values D101 to D104 and the total difference value DALL. To the contrary, calculation of the individual difference values D101 to D104 and the total difference value DALL may be performed by turning off all of the luminaires 2A to 2I in Step SP103 and then turning on the luminaire 2A to be searched in Step SP105.

In Step SP108, the processor 21 estimates a horizontal distance between the location of the luminaire recognition device 5 and the installation site of the luminaire 2A, based on the total difference value DALL and the look-up table 20. Referring to FIG. 11, for example, when the total difference value DALL is 249 lx, the horizontal distance is estimated to be 0 m, while the total difference value DALL is 84 lx, the horizontal distance is estimated to be 1.85 m. In this example, since the luminaire 2A is selected as a luminaire to be searched, the total difference value DALL is about 54 lx, and consequently the horizontal distance is estimated to be about 2.45 m.

In Step SP109, the processor 21 determines whether the installation site of the luminaire 2A is within a recognizable range, based on a result of estimation of the distance in Step SP108. When the distance between the location of the luminaire recognition device 5 and the installation site of the luminaire 2A is too long, the change in illuminance of the luminaire 2A has too little an effect on the detected brightness, resulting in a small total difference value DALL and a long estimated distance in Step SP108. The estimated distance exceeding a predetermined threshold value means low accuracy in luminaire recognition, and thus with such distance, the luminaire 2A is assumed to be out of the recognizable range and its identification information IDA is added to the luminaire search exclusion list (Step SP112). The luminaire search exclusion list includes a sublist for listing and managing the identification information of the luminaire that has been determined to be out of the recognizable range (hereinafter, "out-of-range list"), and a sublist for listing and managing the identification information of the luminaire that has been recognized (hereinafter, "recognized list"). When the estimated distance of a certain luminaire exceeds the above threshold value, the processor 21 adds the identification information of the luminaire to the out-of-range list.

On the other hand, with the estimated distance in Step SP108 below the above threshold value, in Step SP110, the processor 21 compares the individual difference values D101 to D104, so as to estimate the direction of the installation site of the luminaire 2A from the location of the luminaire recognition device 5. For example, with comparatively large individual difference values D103 and D104 and comparatively small individual difference values D101 and D102, the processor 21 estimates the installation site of the luminaire 2A to be in the lower-left direction on the grid from the location of the luminaire recognition device 5. Moreover, for example, with comparatively large individual difference value D101 and comparatively small individual difference values D102 to D104, the processor 21 estimates the installation site of the luminaire 2A to be in the upper direction on the grid from the location of the luminaire recognition device 5. In this example, since the luminaire 2A is selected as a luminaire to be searched, and the individual difference values D103 and D104 are comparatively large and the individual difference values D101 and D102 are comparatively small, the processor 21 estimate the installation site of the luminaire 2A to be in the lower-left direction on the grid from the location of the luminaire recognition device 5.

In Step SP111, the processor 21 recognizes the intersection point corresponding to the luminaire 2A among the intersection points P1 to P9 on the grid, based on a result of the distance estimation in Step SP108 and a result of the direction estimation in Step SP110. In this example, since the luminaire 2A is selected as a luminaire to be searched, potential intersection points are narrowed down to the intersection points P1, P3, P7, and P9 having a horizontal distance of about 2.45 m based on the result of the distance estimation and further narrowed down to the intersection point P7 in the lower-left direction based on the result of the distance estimation, thus the intersection point corresponding to the luminaire 2A is recognized to be the intersection point P7.

Here after Step SP111, the operator may perform error correction of the recognition result of the intersection point. Error in the recognition result of the intersection point may occur possibly due to an error in settings (that is, correlation between the brightness and the distance) of the look-up table 20. Thus settings of the look-up table 20 may be revised for a correct recognition result, and a correction value for correcting an existing set value to a correct set value may be input through the input unit 15. Referring to FIG. 7, the correction unit 23 corrects the look-up table 20 based on the input correction value. As an alternative to inputting the correction value, based on information about a correct intersection point P7 input through input unit 15, the correction unit 23 may be configured to calculate the correction value by itself to correct the look-up table 20.

Referring to FIG. 10, in Step SP112, the processor 21 adds the identification information IDA of the recognized luminaire 2A to the luminaire search exclusion list. More specifically, the identification information IDA of the luminaire 2A is added to the recognized list.

In Step SP113, the processor 21 determines whether all of the luminaires 2A to 2I have been searched. If there is an unsearched luminaire 2, Step SP103 and the subsequent processes are repeated after an update of the identification information. For example, updates are performed in the order of the identification information pieces IDA→IDB→IDC→ . . . →IDI, so that searches are performed in the order of luminaires 2A→2B→2C→ . . . →2I. Here, identification information listed on the luminaire search exclusion list (out-of-range list and recognized list) is excluded from searches. On the other hand, if there is no unsearched luminaires 2 (that is, all of the luminaires 2A to 2I have been searched), luminaire recognition ends.

Luminaire recognition by the luminaire recognition device 5 ends, and thus the identification information pieces IDA to IDI of the luminaires 2A to 2I are associated with the installation sites. Information about the association between the identification information and the installation sites are input from the luminaire recognition device 5 to the master control device 4, and the master control device 4 performs lighting control on desired luminaires 2A to 2I with the luminaire control devices 3A to 3I based on this information.

Description above is given of a non-limiting example of recognizing the luminaires 2 with the luminaire recognition device 5 on the assumption of an environment where nine luminaires 2A to 2I in 3 rows×columns are installed in a grid. Employing the detector 10 having a higher light sensitivity enables the luminaire recognition device 5 to recognize the luminaires 2 under a broader environment with more luminaires 2 installed.

<First Modification>

Figure 13:
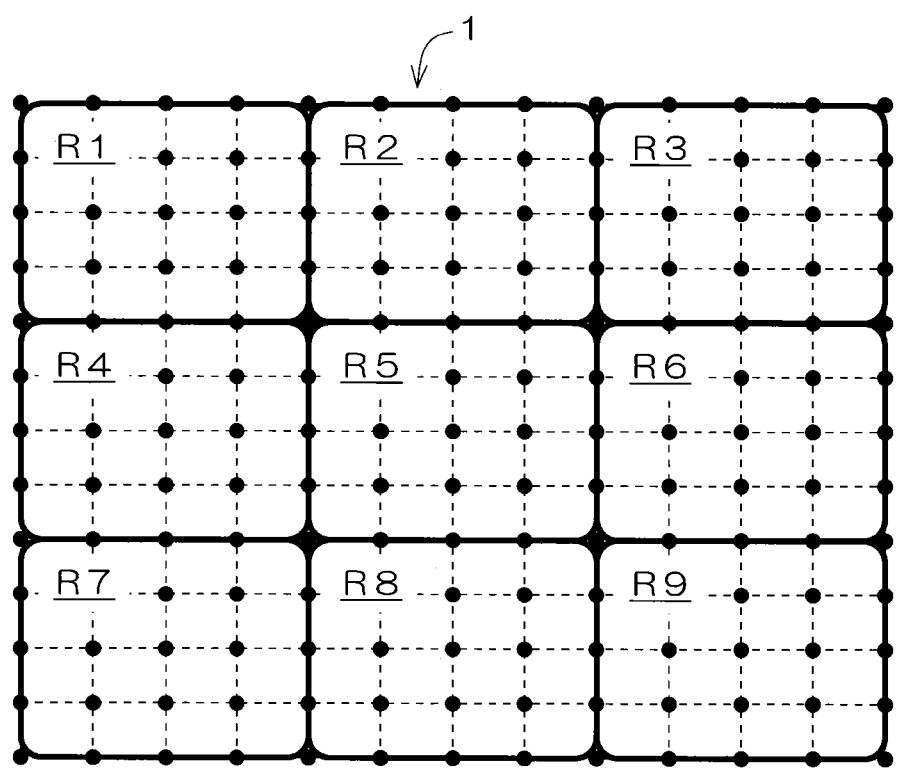
FIG. 13 is a diagram illustrating an example of grid data.

FIG. 13 is a diagram illustrating an example of grid data. In an environment where many luminaires 2 are installed in a wide area 1 such as a waiting room in a hospital and a conference hall in an office, recognizing all luminaires 2 by searching once is generally difficult, depending on the light sensitivity of the detector 10. Thus in such an environment, dividing the area 1 into multiple subareas R1 to R9 allows sequential search by moving the location of the luminaire recognition device 5 for each of the subareas R1 to R. Alternatively, arranging the luminaire recognition device 5 (or the detector 10) in each of the subareas R1 to R9 allows concurrent search for all subareas R1 to R9. In sequential search by moving the location of the luminaire recognition device 5, a luminaire whose identification information has been added to the out-of-range list during search in one location is to be searched in a next location, as the out-of-range list is initialized when search is started in the next location. In contrast, a luminaire whose identification information has been added to the recognized list during search in one location is excluded from search in subsequent locations, as the recognized list is not initialized when search is started in the subsequent locations. As the search proceeds, the identification information pieces of the recognized luminaires gradually accumulate on the recognized list. Thus later search includes less luminaires to be searched, and consequently search duration is reduced.

<Second Modification>

In the above embodiment, the four light receiving elements 101 to 104 are centrally disposed on the same substrate 30, while the light receiving elements 101 to 104 may be decentralized to have independent multiple detectors 10.

Figure 14A:
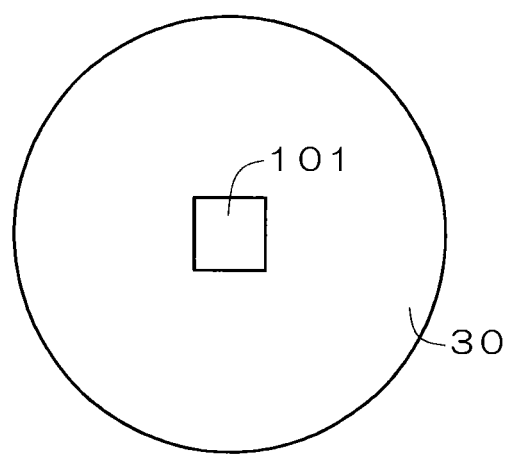
FIGS. 14A and 14B are diagrams schematically illustrating an external configuration of one detector.
Figure 14B:
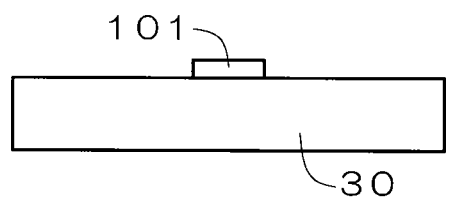

FIGS. 14A and 14B are diagrams schematically illustrating an external configuration of one detector 10. One light receiving element 101 is disposed on the substrate 30. Similarly, other light receiving elements 102 to 104 are also disposed on the substrates 30 separately, although not illustrated in the figure. With this configuration, the four detectors 10 are independently disposed.

Figure 15:
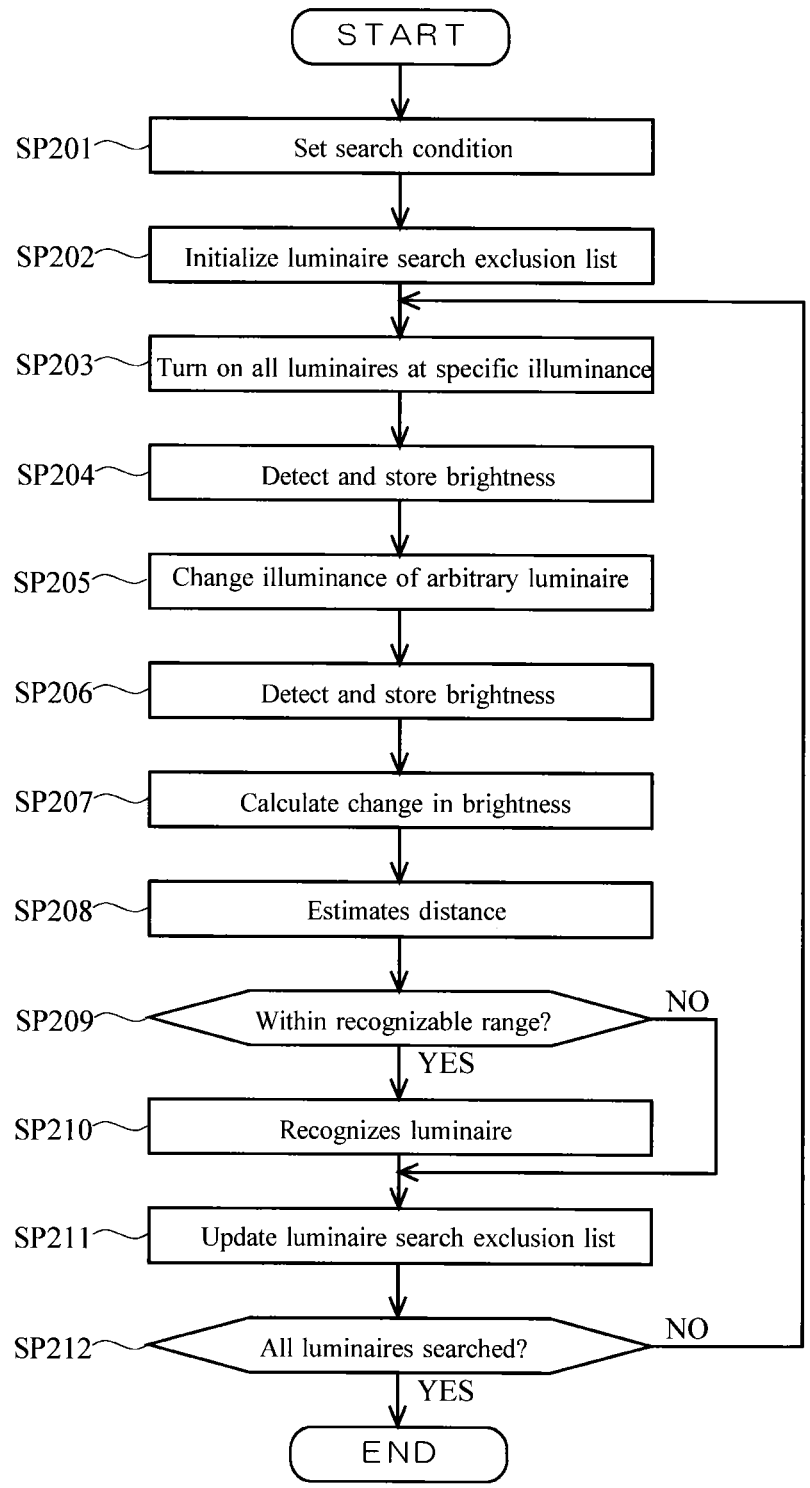
FIG. 15 is a flow chart representing a sequence of luminaire recognition by the luminaire recognition device.

FIG. 15 is a flow chart representing a sequence of luminaire recognition by the luminaire recognition device 5.

Similar to the above embodiment, the look-up table 20 is prepared in advance before the luminaire recognition starts and stored in the memory 18.

The operator arranges the four detectors 10 at arbitrary four locations in the area 1 (in this example, right under the luminaires 2A, 2C, 2G, and 2I at the four corners) at the height of the work plane. Then the operator inputs the location and the direction of the luminaire recognition device 5 through the input unit 15.

Figure 16:
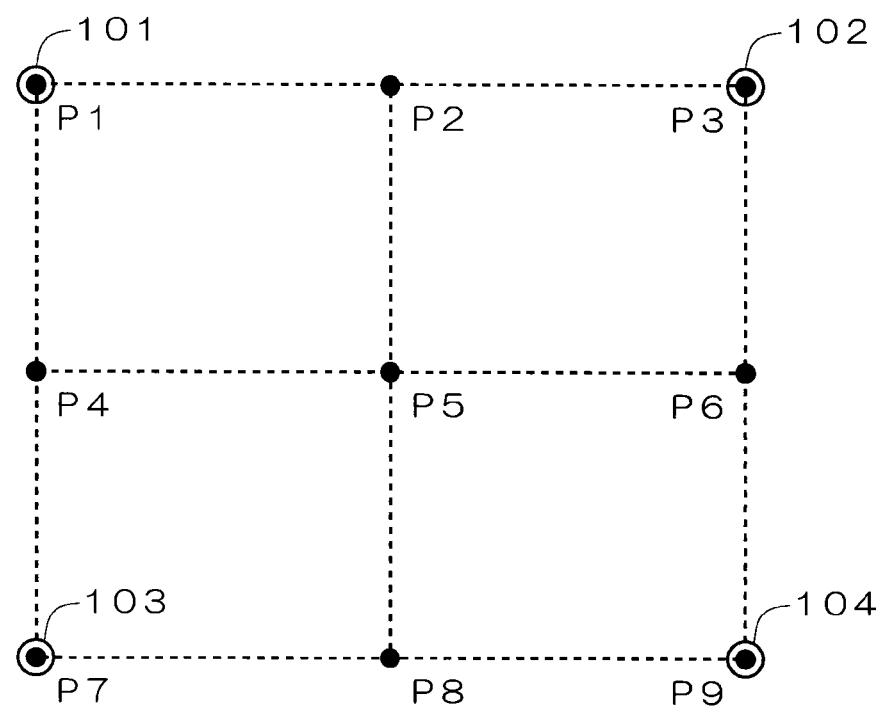
FIG. 16 is a diagram illustrating grid data of the locations of each of the detectors.

Referring to FIG. 15, the processor 21 sets a search condition in Step SP201. More specifically, the locations of each of the detectors 10 are set on the grid illustrated in FIG. 11. FIG. 16 is a diagram illustrating grid data of the locations of each of the detectors 10. In this example, the detectors 10 are respectively arranged on the intersection points P1, P3, P7, and P9.

In Step SP202, the processor 21 initializes the luminaire search exclusion list.

In Step SP203, the processor 21 turns on all of the luminaires 2A to 2I at a specific illuminance (in this example, maximum illuminance).

In Step SP204, the detector 10 detects brightness at the locations of each of the detectors 10 with all of the luminaires 2A to 2I turned on at the specific illuminance. The processor 21 stores brightness values detected by each of the light receiving elements 101 to 104 in the register 171.

In Step SP205, the processor 21 changes the illuminance of an arbitrary one of the luminaires 2 by a defined amount. For example, the luminaire 2A having the identification information IDA is turned off In Step SP206, the detector 10 detects brightness at the locations of each of the detectors 10 with the luminaire 2A turned off The processor 21 stores each brightness value detected by the light receiving elements 101 to 104 in the register 172.

In Step SP207, the processor 21 calculates the change in brightness based on the brightness values stored in the registers 171 and 172. More specifically, the processor 21 calculates individual difference values D101 to D104, which is a difference value of the brightness detected by each of the light receiving elements 101 to 104.

Description above is given of an example of turning on all of the luminaires 2A to 2I in Step SP203 and then turning off the luminaire 2A to be searched in Step SP205, so as to calculate the individual difference values D101 to D104. L To the contrary, calculation of the individual difference values D101 to D104 may be performed by turning off all of the luminaires 2A to 2I in Step SP203 and then turning on the luminaire 2A to be searched in Step SP205.

In Step SP208, the processor 21 estimates a horizontal distance between the location of each of the detectors 10 and the installation site of the luminaires 2A, based on the individual difference values D101 to D104.

In Step SP209, the processor 21 determines whether the installation site of the luminaire 2A is within a recognizable range, based on a result of estimation of the distance in Step SP208. Two or more of the four estimated distances larger than a predetermined threshold value means low accuracy in luminaire recognition, and thus with such distances, the luminaire 2A is assumed to be out of the recognizable range and its identification information IDA is added to the luminaire search exclusion list (out-of-range list) (Step SP211).

On the other hand, with three or more of the four estimated distances smaller than the above threshold value, in Step SP210, the processor 21 recognizes the intersection point corresponding to the luminaire 2A among the intersection points P1 to P9 on the grid, based on a result of the distance estimation in Step SP208.

In Step SP211, the processor 21 adds the identification information IDA of the recognized luminaire 2A to the luminaire search exclusion list (recognized list).

In Step SP212, the processor 21 determines whether all of the luminaires 2A to 2I have been searched. If there is an unsearched luminaire 2, Step SP203 and the subsequent processes are repeated after an update of the identification information. On the other hand, if there is no unsearched luminaires 2A to 2I, luminaire recognition ends.

<Recapitulation>

According to the luminaire recognition device 5 of this embodiment, the memory 18 stores the look-up table 20 indicating correlation information between brightness and distance. The processor 21 changes the illuminance of one of the luminaires to be searched by a defined amount with the controller 22, calculates the change in brightness detected by the detector 10, and recognizes the luminaire to be searched among the luminaires 2A to 2I, based on the change and the correlation information. This configuration realizes simple and reliable association between the identification information and the installation sites of the luminaires without manual work. Moreover, since there is no need for additional implementation of a function to recognize luminaires on numerous luminaires, increase in cost in introducing the system is minimized. Furthermore, recognition of luminaires based on change in brightness detected before and after changing the illuminance of the luminaires achieves accurate recognition of luminaires without influence by outside light.

According to the luminaire recognition device 5 of this embodiment, the detector 10 includes the multiple light receiving elements 101 to 104 with limited directions of light different from each other, as illustrated in FIGS. 8A and 8B. Alternatively, as illustrated in FIGS. 9A and 9B, the luminaire recognition device 5 includes a light receiving element 101 with a limited direction of light and the driving unit 53 that drives the light receiving element 101 to change the direction of light. This configuration allows estimation of not only a distance from a predetermined location where the luminaire recognition device 5 is arranged to a luminaire but also a direction of a site where the luminaire is installed from the predetermined location. Consequently, accurate recognition of each luminaire is achieved, even in a situation where the multiple luminaires 2A to 2I are installed in a matrix form.

According to the luminaire recognition device 5 of the second modification, the detectors 10 respectively include the light receiving elements 101 to 104, with the light receiving elements 101 to 104 arranged at multiple locations in the area 1. This configuration allows estimation of a distance from a location of each of the light receiving elements 101 to 104 to the luminaires. Consequently, accurate recognition of each luminaire is achieved, even in a situation where the multiple luminaires 2A to 2I are installed in a matrix form.

According to the luminaire recognition device 5 of this embodiment, the correction unit 23 corrects the look-up table 20 stored in the memory 18, based on a result of luminaire recognition by the processor 21 Thus even if the look-up table 20 prepared in advance includes an error, correction of the look-up table 20 based on an actual measurement result achieves accurate recognition of luminaires from then onward.

According to the luminaire recognition device 5 of this embodiment, the register 171 (first register) stores first brightness data of a brightness detected by the detector 10 before the illuminance of the luminaires is changed, and the register 172 (second register) stores second brightness data of a brightness detected by the detector 10 after the illuminance of the luminaires is changed. The processor 21 calculates a change in brightness, based on the first brightness data stored in the register 171 and the second brightness data stored in the register 172. This configuration achieves simple and accurate calculation of change in brightness before and after the illuminance of the luminaire is changed.

According to the luminaire recognition device 5 of this embodiment, sequential update of a luminaire to be searched is performed to sequentially recognize each of the multiple luminaires. This configuration realizes recognition of all of the multiple luminaires 2A to 2I installed in the area 1.

According to the luminaire recognition device 5 of this embodiment, a luminaire which have been recognized or have failed to be recognized is added to a luminaire search exclusion list to be excluded from update. Excluding recognized luminaires from update helps avoid repeated recognition of recognized luminaires. Similarly, excluding luminaires which have been failed to be recognized from update helps avoid repeated recognition of unrecognizable luminaires. When there is a luminaire which have been failed to be recognized, the luminaire can be recognized by retrying recognition with the luminaire recognition device 5 at a different location.

While the invention has been described in detail, the foregoing description is in all aspects illustrative and not restrictive. It is therefore understood that numerous modifications and variations can be devised without departing from the scope.

EXPLANATION OF REFERENCE NUMERALS

1 area
2 (2A to 2I) luminaire
3 (3A to 3I) luminaire control device
4 master control device
5 luminaire recognition device
10 detector
101 to 104 light receiving element
171,172 register
18 memory
20 look-up table
21 processor
22 controller
23 correction unit
31 douser
53 driving unit

The invention claimed is:

1. A luminaire recognition device in a lighting system having a plurality of luminaires with a dimming function installed in a predetermined area, the luminaire recognition device being configured to be arranged at a predetermined location in the area, for associating identification information and installation site of each of the luminaires, comprising:
- a controller configured to control an illuminance of each luminaire through communication;
- a detector configured to detect a brightness at the predetermined location;
- a memory configured to store correlation information between a brightness and a distance from the predetermined location to each luminaire; and
- a processor configured to change an illuminance of a luminaire to be searched by a defined amount with the controller, calculate a change in brightness detected by the detector, and recognize the luminaire to be searched among the plurality of luminaires, based on the change and the correlation information.

2. The luminaire recognition device according to claim 1, the detector including a plurality of light receiving elements with limited directions of light different from each other.

3. The luminaire recognition device according to claim 1, the detector including
- a light receiving element with a limited direction of light; and
- a driving unit configured to drive the light receiving element to change the direction of light.

4. The luminaire recognition device according to claim 1, the detector including a plurality of light receiving elements,
wherein the plurality of light receiving elements are arranged at a plurality of locations in the area.

5. The luminaire recognition device according to claim 1, further comprising:
- a correction unit configured to correct the correlation information stored in the memory based on a result of luminaire recognition by the processor.

6. The luminaire recognition device according to claim 1, further comprising:
- a first register configured to store first brightness data of a brightness detected by the detector before an illuminance of the luminaire to be searched is changed; and
- a second register configured to store second brightness data of a brightness detected by the detector after an illuminance of the luminaire to be searched is changed,
wherein the processor is configured to calculate the change based on the first brightness data stored in the first register and the second brightness data stored in the second register.

7. The luminaire recognition device according to claim 1, wherein
the processor is configured to sequentially update the luminaire to be searched so as to sequentially recognize each of the plurality of luminaires.

8. The luminaire recognition device according to claim 7, wherein
the processor is configured to exclude a luminaire which have been recognized or failed to be recognized from update.

9. A lighting system including a plurality of luminaires with a dimming function installed in a predetermined area, the lighting system comprising:
- a luminaire control device connected to each of the plurality of luminaires and configured to perform lighting control on the connected luminaires;
- a master control device configured to control the luminaire control device for lighting control of the plurality of luminaires based on an environmental factor of the area; and
- a luminaire recognition device arranged at a predetermined location in the area to associate identification information and an installation site of each luminaire, the luminaire recognition device including
- a controller configured to control an illuminance of each luminaire through communication;
- a detector configured to detect a brightness at the predetermined location;
- a memory configured to store correlation information between a brightness and a distance from the predetermined location to each luminaire; and
- a processor configured to change an illuminance of a luminaire to be searched by a defined amount with the controller, calculate a change in brightness detected by the detector, and recognize the luminaire to be searched among the plurality of luminaires based on the change and the correlation information.

10. A luminaire recognition method in a lighting system having a plurality of luminaires with a dimming function installed in a predetermined area, for associating identification information and installation site of each luminaire, the luminaire recognition method comprising:
- controlling an illuminance of each luminaire through communication;
- detecting a brightness at a predetermined location in the area;
- preparing correlation information between a brightness and a distance from the predetermined location to each luminaire; and
- changing an illuminance of a luminaire to be searched by a defined amount in the controlling the illuminance, calculating a change in brightness detected in the detecting the brightness, and recognizing the luminaire to be searched among the plurality of luminaires based on the change and the correlation information.

* * * * *